UNITED STATES PATENT OFFICE.

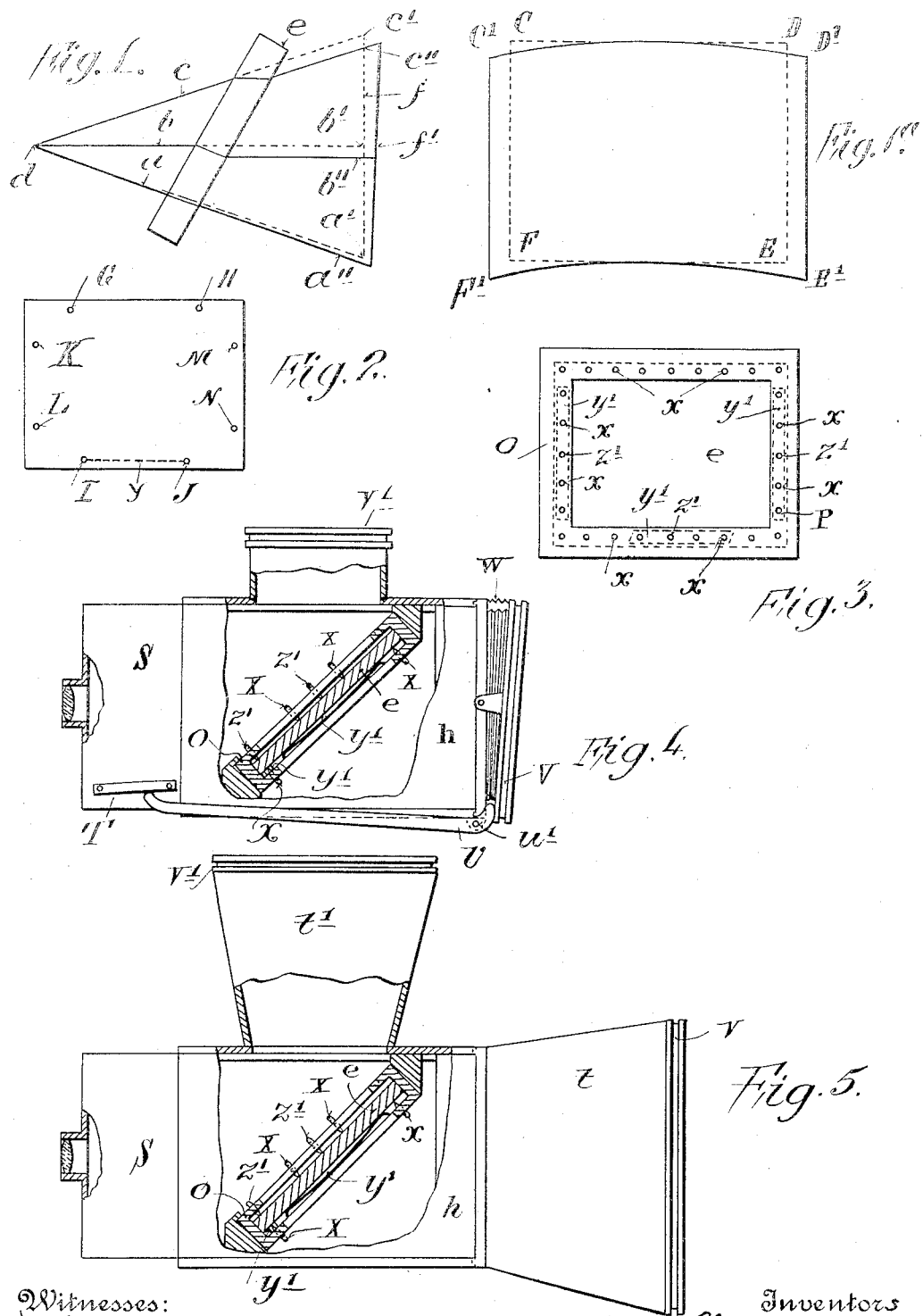

ALEXANDER EUGEN CONRADY AND ARON HAMBURGER, OF LONDON, ENGLAND.

COLOR PHOTOGRAPHY.

1,140,576.   Specification of Letters Patent.   Patented May 25, 1915.

Application filed April 4, 1913. Serial No. 758,823.

*To all whom it may concern:*

Be it known that we, ALEXANDER EUGEN CONRADY, a subject of the King of Great Britain and Ireland, and residing at 23 Flanchford road, London, W., England, and ARON HAMBURGER, a citizen of the United States of America, and residing at 38 Dover street, Mayfair, London, W., England, have invented certain new and useful Improvements in and Relating to Color Photography, of which the following is a specification.

This invention relates to improvements in connection with color photography cameras of the kind in which a colored reflector filter is inserted in the path of the rays from the lens, and separates the pencil of light into two portions, one transmitted to a sensitive medium by reflection and the other to a sensitive medium by transmission through the reflector filter.

The invention will be described with reference to the accompanying drawings in which—

Figure 1 is a diagram showing how the main distortion of the transmitted image is produced by the insertion of the reflector filter, Fig. 1$^a$ indicates the nature of a secondary distortion which is found to be produced in the transmitted image, Fig. 2 indicates the manner in which pressure should in the case of a perfectly plane filter according to our invention be applied to the filter in order to effect a compensating distortion of the filter. Fig. 3 indicates in part elevation a simple form of device for effecting the distortion in practice, Fig. 4 indicates a camera provided with such a device and with means for keeping the tilt of the screen appropriate to the focus adjustment of the camera. Fig. 5 shows a camera with plate holding attachments for increasing the size of the image without alteration of the reflector filter.

The introduction of the glass reflector in cameras of the kind referred to causes, as is well known, a displacement of the rays passing through the filter in the manner indicated in Fig. 1 of the accompanying diagrams which shows how rays $a$, $b$, $c$, passing from optical center $d$ of the lens through the filter $e$ to the focusing plane $f$, are lowered by the filter from the point $a'$, $b'$, $c'$, to the position $a''$, $b''$, $c''$, this effect being greater at the top than at the bottom of the reflector; but by moving the focusing plane farther away from the lens center $d$ to a position $f'$ and by tilting it in the same sense as the reflector as indicated in the diagram, the distortion resulting from this displacement of the rays can be compensated and calculation shows that this compensation is more than sufficiently accurate in the vertical center line of the rays. When the calculation is extended to the remaining parts of the focusing plane however, it is found that these are affected by a secondary distortion, the sense of which is shown in Fig. 1$^a$ which indicates in front view at C D E F the true image of a square object, while C' D' E' F' shows greatly exaggerated the image actually obtained. With the largest practicable field for this type of camera, namely, about 32° in the direction C D and 25° in the direction D E, calculation shows the distance apart of the vertical lines C F, C' F' to amount to about 1/25th of the thickness of the transparent reflector; while the curvature of the horizontal lines is such as to bring the point C' about 1/60th of the thickness of the reflector lower than the corresponding ideal point C. As a reflector filter may often require to be a quarter of an inch in thickness the errors of registration between the images obtained by the transmitted and reflected rays respectively become very serious.

It is the object of the present invention to provide means whereby these disadvantages may be readily and completely removed. Again in cameras of this type as the focus is increased it becomes necessary to diminish the tilt of the focusing plane (the latter having been tilted to compensate for the bulk of the distortion already referred to), and according to this invention we provide for effecting this automatically as required.

Further objects of the invention are to provide for increasing the size of the images obtained beyond the size normally obtainable with any particular filter and to provide for an improved distribution of the rays by reflection from and transmission through the reflector filter.

This invention consists in correcting for the distortion produced by reflector filters in cameras of the type described by distortion of the reflector filter as by application of different pressures at various points around its edges.

This invention further consists in automatically effecting correction of inclination of the focusing plane with alteration in focus as by pivotally mounting the focusing screen and connecting it by links or the like with the focusing means.

This invention also consists in the improvements in and relating to cameras for color photography hereinafter indicated.

In carrying this invention into effect in the preferred form, we provide means for applying pressure to the reflector at suitable points in order to bend the same and introduce distortions of the same sense and magnitude into the reflected image as are inevitably present in the transmitted image. Where the reflector in its natural, unstrained condition is perfectly flat the correction can be effected by supporting it from the side of the focusing screen in four points, a pair G, H, at its upper edge and a pair I, J, at its lower edge, either the upper or lower pair of these supporting points being interconnected as at Y so as to equalize the pressure on them and insure steadiness, while from the front pressure is applied to the other edges at points K, L, M, N. It is desirable to apply the pressure resiliently; as the actual displacement required to effect correction is in most cases minute.

The theoretical form of a perfectly plane and optically uniform mirror when corrected is that of a portion of the surface of a cone of extremely large base, diameter and height. The difficulties of producing optically perfect reflectors especially when these have to be provided with deposited films on one or both sides, are, however, so great that it is found in practice that the residual distortions of the image is likely to be very much greater than the calculated amount, and is not infrequently actually in the reverse direction. The preferred way of correcting these residual distortions consists in bending the reflector by pressure applied in suitable points, in such a way as to introduce distortions of the same sense and magnitude into the reflected image as are inevitably present in the transmitted image. With an average reflector, therefore, pressure may be needed at almost any point and in either direction, and we accordingly preferably provide for the reflector a rigid frame of U section O Fig. 3 with a number of screw threaded holes P all around and on both faces at distances say of 1 inch from each other, into which pressure screws $x$ may be inserted where required. Three adjustable supporting points $z'$ with strong springs $y'$ opposite to them are further provided in suitable widely separated positions, so as to fix the distance of the reflector from the faces of the frame, and by adjusting these three points reflectors of varying thickness may be so adjusted as to act correctly when the frame is inserted in its same fixed supports in the camera, thus provided for interchangeability of reflectors. The correction may be effected by adjusting the pressure at different points until the transmitted and reflected images are of the same size.

In order to provide for diminution of the tilt of the focusing plane when the focus of the lens is increased we provide in the preferred form a long lever bearing with its long arm on an inclined guiding bar adjustably attached to the sliding part of the focusing adjustment, while the short arm of the lever acts on the tilting movement of the focusing screen. This is indicated in the camera shown in Fig. 4 in which the adjustable portions of the camera $h$ has upon it an inclined guide T upon which bears a bellcrank lever U pivoted at U' upon the camera and adapted to alter the inclination of the pivotally mounted plate holder V under the influence of the spring W.

As the difficulties of correcting for distortion increase rapidly with increase in size of the reflector filter, it is always desirable to keep the size of the reflector filter at a minimum, and we accordingly (see Fig. 5) provide attachments $t$ and $t'$ with plate holding devices $v$ and $v'$ so that these may be applied in place of the normal plate holding devices, and by increasing the distance between the plate holder and the filter in the main body of the camera $h$ increase the size of the image without changing the size of the filter. As the effective length of the camera is thus lengthened, a diminution of tilt is required in the focusing frame of the plate receiving the transmitted image, and the required tilt is but very slight; the extension box for the transmitted image being shown wedge-shaped, but very much exaggerated in the accompanying drawing. Moreover, in order to equalize the distribution of reflected and transmitted light and to increase the proportion reflected, we find it preferable to employ a reflector filter which is sufficiently silvered or otherwise caused to have increased reflecting power to increase the proportion of reflected light so as to make the exposure value of the reflected rays more nearly equal to that of the transmitted rays. This distribution of rays may also be improved by inserting in the path of the rays a color screen adapted to modify the proportion of the transmitted and reflected rays reaching their respective sensitive media.

Having now described our invention what we claim as new and desire to secure by Letters Patent is:—

1. A method of obtaining negatives for color photographs consisting in intercepting the rays proceeding from the object by an inclined colored transparent reflector, placing light sensitive media to receive the transmitted and reflected rays respectively and distorting aforesaid reflector by pressure applied thereto so as to produce identity in the reflected and transmitted images, the plane of the light sensitive medium exposed to the transmitted ray being given an inclination to an imaginary axis joining the optical center of the medium, the filter and the object and of the same sense as the inclination of the filter, as set forth.

2. A reflector filter device for color photography, comprising a frame, a reflector filter within said frame, stops and springs supporting said reflector filter rigidly within the frame, and a number of pressure applying devices adapted for independent adjustment mounted in said frame and capable of bearing upon aforesaid reflector filter about its edges, as set forth.

3. A reflector filter camera for obtaining negatives for color photography having two separate light sensitive media, an inclined reflector filter adapted to intercept the rays entering the camera and to distribute them by reflection and transmission respectively between the two sensitive media, a pivotally mounted plate holding device, holding the aforesaid light sensitive medium receiving the transmitted rays from the reflector filter, said device being situated at the extremity of the longitudinal axis of the camera, a focusing element and a member transmitting the motion of the focusing element to the pivotal plate holding device, substantially as described.

4. A reflector filter camera for obtaining negatives for color photography having a focusing element, two separate plate holding elements one of which is pivotally mounted, an inclined reflector filter adapted to intercept the rays entering the camera and to distribute them upon the two plate holding elements by reflection and transmission respectively, said pivotally mounted plate holding element being adapted to receive the transmitted rays, and a lever partaking of the motion of the focusing element and adapted to tilt the pivotally mounted element toward or from the inclined reflector filter according as the focusing element effects increase or decrease of focus, as set forth.

5. A camera for color photography, comprising a main camera box having two openings in the walls thereof, an inclined reflector adapted to distribute to these two openings by reflection and transmission respectively rays falling upon it, and truncated pyramidal plate-holding boxes applied to aforesaid openings, the plate-holding plane of that plate-holding box receiving the transmitted rays from the reflector filter having somewhat less than perpendicular inclination toward the axis of the rays passing into the reflector filter, said inclination being in the same sense as that of the reflector filter to said axis, as set forth.

In testimony whereof we have signed our names to this specification in the presence of two subscribing witnesses.

ALEXANDER EUGEN CONRADY.
ARON HAMBURGER.

Witnesses:
H. D. JAMESON,
O. J. WORTH.

---

It is hereby certified that in Letters Patent No. 1,140,576, granted May 25, 1915, upon the application of Alexander Eugen Conrady and Aron Hamburger, of London, England, for an improvement in "Color Photography," errors appear in the printed specification requiring correction as follows: Page 1, line 56, after the word "plane" insert the reference-letter *f;* page 2, line 81, for the word "portions" read *portion s;* page 3, lines 54–55, after the word "reflector" insert the word *filter;* and that the said Letters Patent should be read with these corrections therein that the same may conform to the record of the case in the Patent Office.

Signed and sealed this 27th day of July, A. D., 1915.

[SEAL.]

R. F. WHITEHEAD,
*Acting Commissioner of Patents.*